(12) United States Patent
Page et al.

(10) Patent No.: US 8,014,929 B2
(45) Date of Patent: Sep. 6, 2011

(54) METHOD OF MONITORING A GAS TURBINE ENGINE

(75) Inventors: Michael Page, Derby (GB); Richard Lawrence Webb, Derby (GB); Scott Frazer Howard, Derby (GB)

(73) Assignee: Rolls-Royce PLC (GB)

( * ) Notice: Subject to any disclaimer, the term of this patent is extended or adjusted under 35 U.S.C. 154(b) by 731 days.

(21) Appl. No.: 12/263,835

(22) Filed: Nov. 3, 2008

(65) Prior Publication Data

US 2010/0280730 A1    Nov. 4, 2010

(30) Foreign Application Priority Data

Nov. 15, 2007  (GB) ................................. 0722398.5

(51) Int. Cl.
*G06F 19/00*    (2006.01)
(52) U.S. Cl. ....................................................... 701/100
(58) Field of Classification Search .................. 701/29, 701/100; 73/112.01; 60/778
See application file for complete search history.

(56) References Cited

U.S. PATENT DOCUMENTS

2005/0261820 A1* 11/2005 Feeney et al. ................. 701/100
2006/0225403 A1   10/2006 Tsuzuki et al.
2008/0155961 A1*  7/2008 Johnson ....................... 60/226.3

FOREIGN PATENT DOCUMENTS

EP     1705542 A1    9/2006
EP    17903838 A1    5/2007

* cited by examiner

*Primary Examiner* — Kim T Nguyen
(74) *Attorney, Agent, or Firm* — McCormick, Paulding & Huber LLP

(57) ABSTRACT

Operation of gas turbine engines and in particular gas turbine engines utilised for aircraft, in an efficient manner is a desired objective. Thus engine efficiency is typically determined through use of an engine performance parameter. One such engine performance parameter is with regard to specific fuel consumption. However, such parameters may vary as a result of inherent deterioration with regard to the engine. By utilising a computational model to determine variations in the performance parameter such as the specific fuel consumption changes as a result of such inherent engine degradation can be accommodate. Thus, such degradation may not swamp actual changes in fuel consumption or the engine performance parameter which are indicative of changes of engine efficiency. Generally and initially, computational results are utilised in order to provide a value with regard to degradation changes in the performance parameter, but such changes may be augmented by practical test results in order to tune the off-set constants a, b for an individual engine.

8 Claims, 3 Drawing Sheets

METHOD OF MONITORING A GAS TURBINE ENGINE

CROSS REFERENCE TO RELATED APPLICATION

This application is entitled to the benefit of British Patent Application No. GB 0722398.5, filed on Nov. 15, 2007.

FIELD OF THE INVENTION

The present invention relates to methods of monitoring a gas turbine engine and more particularly with respect to monitoring engine performance parameters such as fuel consumption as an indicator of engine efficiency.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbine 16, 17 and 18 respectively drive the high and intermediate pressure compressors 14 and 13, and the fan 12 by suitable interconnecting shafts.

In view of the above, it will be appreciated that operation of a gas turbine engine is dependent upon a number of factors and it is desirable to operate that engine as efficiently as possible. A good measure of performance efficiency and health of a gas turbine engine is through specific fuel consumption (SFC) where SFC=fuel flow divided by net thrust from the engine. Unfortunately, with regard to gas turbine engines in service, that is to say with regard to an aircraft application on-wing, it is not possible to obtain a direct measurement of engine thrust. In such circumstances a traditional approach relates to monitoring changes in engine on-wing fuel burn through noted changes in measured fuel flow at measured engine power setting parameters. These power setting parameters are directly related to engine thrust and can be one of several parameters such as core engine pressure ratio, low pressure shaft speed or integrated core and bypass pressure ratio. In such circumstances, on-wing or in operation monitoring of the fuel flow to the gas turbine engine at a power setting parameter is used to give an indication of any deterioration in the efficiency of the engine. A specified power setting parameter is required as power transients will inherently involve changes in fuel flow rate.

Although monitoring of fuel flow at engine power settings gives a reasonable measure of the health of the engine and its efficiency it will be understood that the usefulness of this monitoring can be limited or diminished due to normal or expected engine deterioration. It will be appreciated that an engine deteriorates through wear in service and therefore the relationships between net thrust and power setting parameters can change slightly. These changes are small from the point of view of the integrity of engine power settings but significant relative to monitoring changes in fuel burn at the power setting to determine levels of efficiency. It will be appreciated that changes of 0.1% are generally considered significant with regard to monitoring fuel flow for efficiency. For example, with regard to core engine pressure ratio, engine degradation will cause the net thrust at the core engine pressure ratio to increase by in the order of 0.2 to 1.0%. In such circumstances the measured deterioration in engine fuel flow at the core engine pressure ratio will appear to be higher than the genuine deterioration in engine specific fuel consumption and so give a more pessimistic view of fuel consumption for the engine than is present in reality.

SUMMARY OF THE INVENTION

It will be appreciated that more accurate determination of engine efficiency will allow improvements with respect to achieving performance with respect to a gas turbine engine.

In accordance with aspects of the present invention there is provided a method of monitoring a gas turbine engine at a predetermined power setting for the engine as a determinant of engine efficiency, the method characterized in that a value for the engine performance parameter is adjusted for operational deterioration in the performance parameter, the value for the change in the parameter (S) is given by a relationship:

a) S=(a×change in the parameter at core constant pressure ratio)+(b×change in the parameter at by-pass pressure ratio).

Whereby a and b are constants determined for a specific engine type by analysis through a computer model of the specific engine with the steps of:

a) Determination of engine performance parameter values using a computer model with deterioration assumed only in the low pressure system for the engine to provide a low data set;

b) Determination of engine performance parameter values using a computer model with deterioration assumed only in the core pressure system for the engine to provide a core data set;

c) Determination of engine performance parameter values using a computer model with deterioration assumed in all pressure systems for the engine to provide a combined data set;

d) Scaling the low data set, the core data set and the combined data set to an equivalent of a predetermined value of deterioration in the value of S and plotting a relational variation for the relative changes in parameters due to the low pressure system and the core pressure system;

e) Comparing the relative changes in the parameters due to the low pressure system and the core pressure system as solutions for the constants a, b in the relationship above through use of simultaneous equation analysis and solution of the respective relational variations;

Thereby determining engine deterioration and subsequently improving the engine's operational efficiency.

Typically, the core system comprises a high pressure system and, where present, an intermediate pressure system of a gas turbine engine.

Generally, the pressure systems include fan and turbine combinations in the gas turbine engine.

Generally, the predetermined value of deterioration is above 0.1%.

Generally, the low, core and combination data sets are determined by the same computational model or an aggregate of results from a plurality of computational models for each data set.

Possibly, the data sets are combined with test results for determination of engine performance parameters with regard to the engine. Possibly, the data sets are augmented with in-service operational test results for the engine performance parameters.

Aspects of the present invention also include a gas turbine engine operated in accordance with the method defined above.

DETAILED DESCRIPTION OF THE PREFERRED EMBODIMENTS

Figure 1:
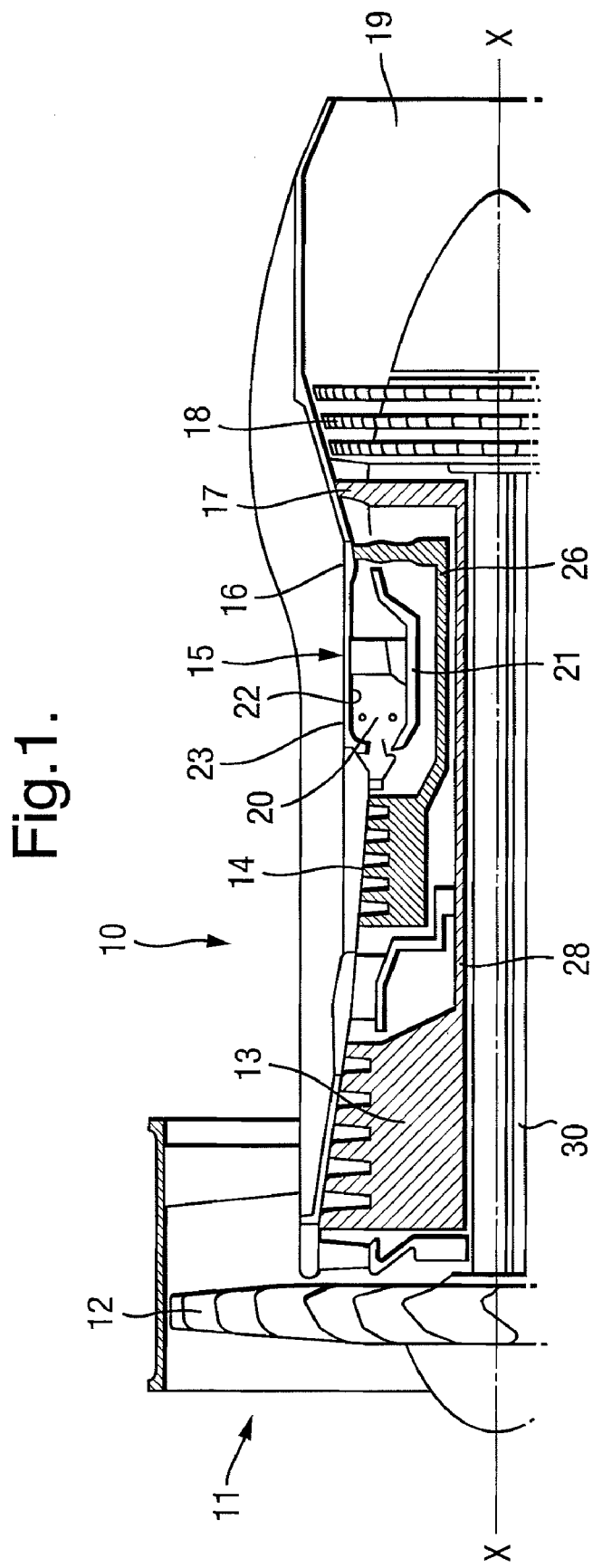
FIG. 1 is a simplified schematic illustration of a gas turbine engine utilizing a method provided by the present invention.

The description of an embodiment of aspects of the present invention is with regard to fuel flow changes but other indicators as engine performance parameters could be used.

In accordance with aspects of the present invention, an improved approach to monitoring specific fuel consumption is provided based upon measurement of the engine fuel burn deterioration in use to provide an equivalency with regard to deterioration of engine specific fuel consumption. In such circumstances there is an improvement with respect to accuracy with regard to determining specific fuel consumption as an indicator or parameter of engine performance. As indicated above, variations in specific fuel consumption may be as a result of deterioration of the engine itself rather than lack of efficiency with regard to the engine performance. By monitoring or projecting deterioration of an engine and therefore scaling more accurate indicators with regard to specific fuel consumption as a result of such degradation operational efficiency with regard to the engine is achieved.

Aspects of the present invention provide a combination of bypass pressure ratio as well as core pressure ratio in terms of determining the specific fuel consumption. The bypass pressure ratio is taken from the low pressure system of a gas turbine engine whilst it will be appreciated that the core pressure ratio is generally taken from the high pressure system as well as, where present, the intermediate pressure system within a gas turbine engine. The pressure systems comprise the combinations of compressors and turbines in the gas turbine engine generally coupled through shafts.

Additionally, aspects of the present invention utilise provision of an adjustment in terms of change in specific fuel consumption as a quotient for producing a more accurate measure of net thrust and cruise conditions by combining the use of core and bypass pressure ratios. In such circumstances a relationship in the form of an equation defined as:

a) Change in engine SFC or S=(a multiplied by change in fuel flow at core pressure ratio)+(b multiplied by change in fuel flow at bypass pressure ratio) where the constants a and b are derived from an engine performance model. The constants a and b in such circumstances act as correcting factors for expected deterioration such that such factors will not obscure engine efficiency results.

Typically, these values may be in the order of a=0.2 to 0.3 and b=0.5 to 0.6.

Figure 2:
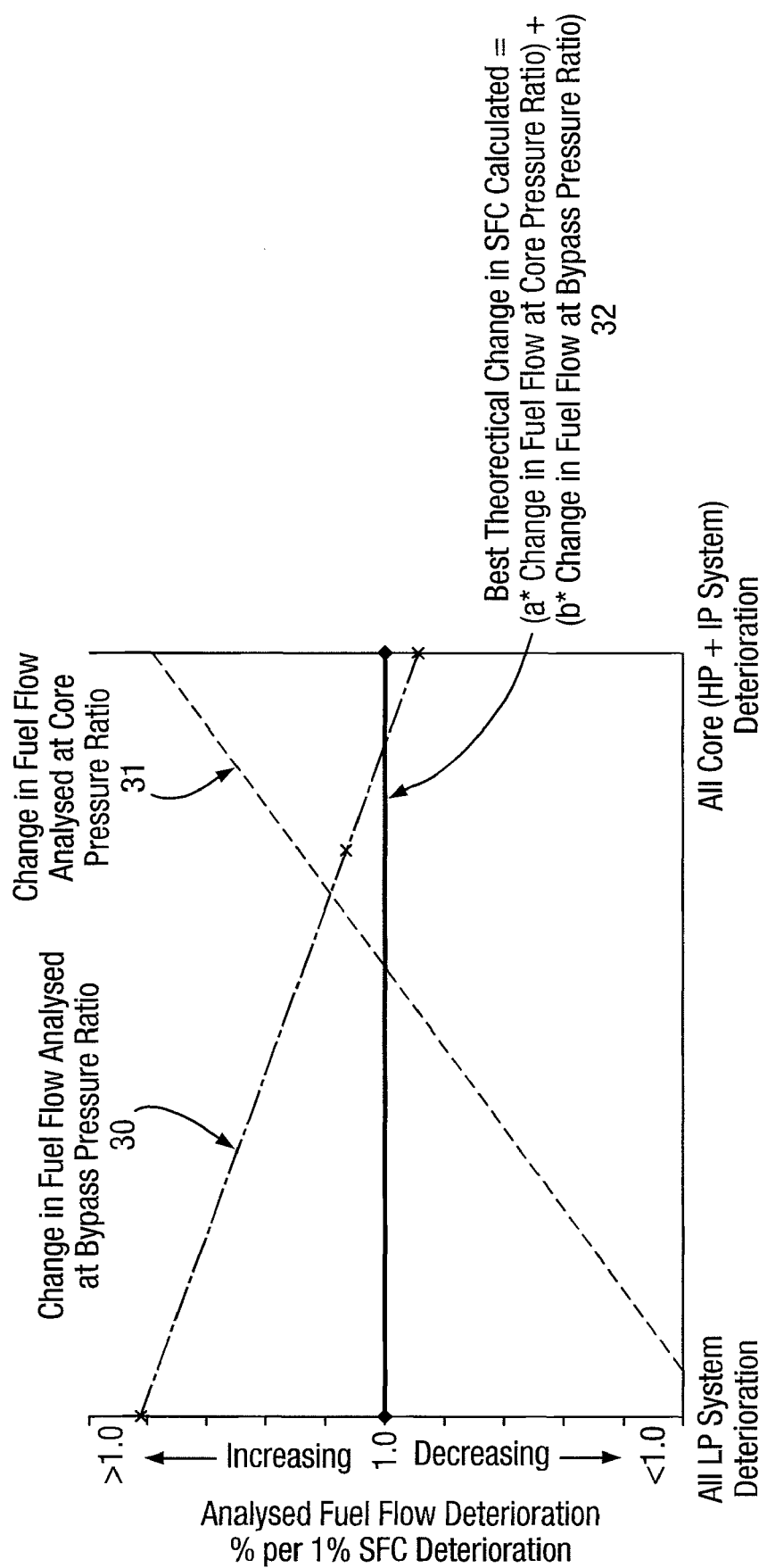
FIG. 2 is a graphic representation with regard to fuel flow deterioration relative to specific fuel consumption relative to a low pressure system and a core pressure system deterioration; and, FIG. 3 provides a block diagram illustrating a method and process, in accordance with aspects of the present invention, to provide a specific fuel consumption value for determination of engine efficiency in accordance with aspects of the present invention.

The method utilized in accordance with aspects of the present invention derives the constants a and b as follows and through utilisation of a computer modelling programme for a specific engine in relation to an engine performance parameter such as fuel flow ratio. The steps involved include:

a) Determination of an engine performance parameter, utilising an engine performance model in relation to a new and a deteriorated engine assuming deterioration only in respect of the low pressure system, that is to say the low pressure fan and low pressure turbine combination to provide a low data set.

b) Determination of the engine performance parameter, utilising a computer model to model the parameter at a new and a deteriorated engine condition assuming deterioration only in the core pressure system, that is to say the high pressure and where present, the intermediate pressure compressors and turbines of the gas turbine engine combination to provide a core data set.

c) Determination of the engine performance parameter, utilising the computer model in relation to a new and a deteriorated engine assuming deterioration in both the low pressure system and the core pressure system combinations of the gas turbine engine to confirm linearity in the relationship between them and provide a combined data set.

d) For both the new and the deteriorated results for the engine parameter scaling the data set, that is to say the low data set for the low pressure system, the core data set for the core pressure system and the combined data set for the combined deterioration determined at steps i, ii and iii above. The scaling providing for a predetermined deterioration or change in the engine performance parameter i.e. specific fuel consumption, then plotting the calculated changes in the engine performance parameters due to deterioration in either the low pressure system or the core pressure system. This plotted relationship is illustrated with regard to FIG. 2.

e) From the graphical plots or consideration of the relative variations in values as a result of scaling the respective lines 30, 31 as depicted in FIG. 2 represent the changes in the parameter such as fuel flow at a core pressure ratio (line 31) and change in fluid flow at a bypass pressure ratio (line 30) in order to match the change in fuel flow at a predetermined thrust level, that is to say the specific fuel consumption change at that thrust level.

f) Taking the change in engine specific fuel consumption (S) it is possible, through consideration of the trends depicted by lines 30, 31 to solve simultaneous equations for these plotted lines 30, 31 in order to provide solutions for the constant a and for the constant b, which match the specific fuel consumption change lines 30, 31.

Considering FIG. 2, it will be appreciated at indicated that the line 30 represents respective fuel flow deterioration as a percentage per 1% specific flow consumption deterioration as a result of bypass pressure ratio, within the low pressure system within the gas turbine engine whilst line 31 represents the change in fuel flow as a deterioration percentage per 1% specific fuel consumption deterioration for a core pressure ratio. Thus, a correction factor in order to eliminate the effects of engine deterioration causing a significant change in the specific fuel consumption value and therefore distorting the efficiency quotient determined from that specific fuel consumption value. As indicated, ideally the off-sets given by constants a, b as a result of the deteriorations high-lighted by lines 30 and 31 should be eliminated. In such circumstances, line 32 represents a theoretical best change in specific fuel consumption given by the relationship (a×change in fuel at core pressure ratio) plus (b×change in fuel flow at bypass pressure ratio). In such circumstances, quotients or constants a and b are determined by the scale of the slopes for lines 30, 31. In such circumstances the systemic deterioration or alteration in the fuel flow rate can be eliminated from the sensed fuel flow rate to isolate the actual change in specific fuel consumption rate indicative of changes in engine performance. Aspects of the present invention tend to eliminate the inherent deterioration in fuel flow change as a result of engine wear and other factors, which as indicated will distort the results with respect to specific fuel consumption as an indicator of engine performance.

It will be appreciated that a computational model for a specific engine is required in order to determine the engine parameter variations between new and after deterioration of the engine. The alternative of utilising practical test bed results with regard to degradation will not allow accurate determination of as new and as specifically deteriorated by the predetermined value in order to provide the trends for determination of the constants a, b as described above. Furthermore, deterioration with respect to practical test bed and operational results will inherently be with regard to both the core and the bypass (low) pressure systems and these systems may deteriorate at different rates. Nevertheless, by aspects of the method and process of the present invention more accuracy may be achieved by utilising test bed data to give a more accurate measure of absolute fuel flow at certain thrust conditions, that is to say on-wing specific fuel consumption deterioration since last test bed performance or testing. Such combination with specific fuel consumption differences between last test bed results and specific fuel consumption of the engine at new can then be utilised to provide further tuning of the computational model and the relative variation value trends defined by lines 30, 31 in FIG. 2 above. In such circumstances, it may be possible to derive an overall measure of the specific fuel consumption deterioration of an engine since new and, therefore, utilise that as a correction factor with regard to specific fuel consumption values utilised for determining engine efficiency.

Figure 3:
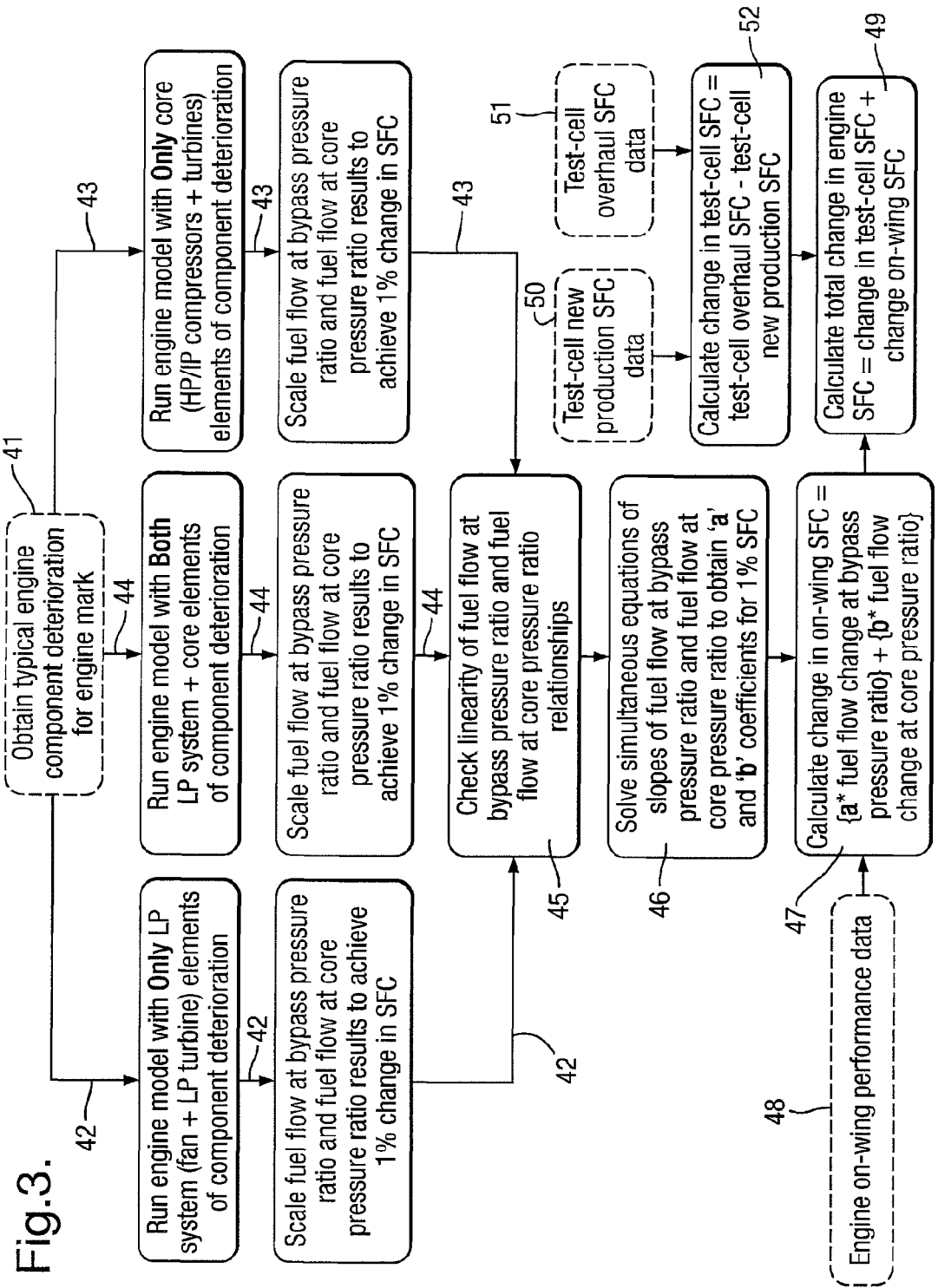

FIG. 3 provides a block diagram illustrating the process steps with regard to a method in accordance with aspects of the present invention. Thus, initially definition of typical engine component deterioration for an engine type 41, initiates processing in accordance with a performance computation model along paths 42, 43, 44.

As illustrated above with regard to step i, along path 42, an engine performance computational model is operated, assuming degradation and deterioration only with respect to the low pressure system and then these results scaled in order to provide for a 1% change in specific fuel consumption.

With respect to path 43, as indicated above with regard to step ii, the computational model is operated with respect to assuming deterioration and degradation with regard to only the high pressure or core compressor system of a gas turbine engine and then the results scaled relative to a 1% change in the specific fuel consumption of that engine.

With respect to path 44, as indicated above with regard to step iii, the computational model is operated assuming deterioration and degradation with regard to the low pressure (bypass) pressure system and core pressure system of a gas turbine engine and then the results scaled to achieve a 1% change in specific fuel consumption for that gas turbine engine.

The results taken from paths 42, 43, 44 are checked for linearity in terms of fuel flow at the bypass pressure ratio and the core pressure ratio relationships at process stage 45. These relationships are effectively plotted or considered in accordance with FIG. 2. In such circumstances, the slopes of the respective plotted results can be considered a simultaneous equation for relational variation, which can be solved in order to obtain the constants a, b for a 1% specific fuel consumption deterioration.

With the constants a, b determined as indicated, it is possible to calculate S, that is to say change in specific fuel consumption as a result of degradation and deterioration. As will be recalled the determining relationship is S=(a×fuel flow change at the core pressure ratio)+(b×fuel flow change at the bypass pressure ratio). This calculation for the particular engine type is determined at process stage 47 utilising the results of the simultaneous equation solution provided at process stage 46.

As indicated above, practical performance data 48 may also be added to the calculation performed at process stage 47 in order to achieve a total change in engine SFC as determined at a process stage 49 by addition of the change in test cell specific fuel consumption with the change expected as a result of degradation or on-wing engine performance at a process stage 49.

It will be appreciated that the change in test cell specific fuel consumption will be as a result of test cells performed on the engine 50 at new production, compared to the test cell results on that engine after overhaul to produce data 51. Thus the initially new production engine specific fuel consumption data will be deducted from the test cell data for that engine once overhauled after a period of operational use. This deduction will occur at a process stage 52, prior to combination with the results achieved at process stage 47.

As indicated above, specific fuel consumption is utilised in terms of determining engine efficiency in an operational gas turbine engine. Previous systems have been susceptible to errors when the mode of deterioration with regard to the engine has now been closely followed or has not followed normal expectations, that is to say when more or less than typical deterioration has been noted in the core or the low pressure systems. By the method in accordance with aspects of the present invention, a more accurate calculation of change in engine specific fuel consumption is achieved irrespective of the mode of deterioration of the engine in use. Thus, aspects of the present invention allow calculation of in-flight specific fuel consumption for in-service engines to a much higher accuracy than previous approaches, particularly if practical in use performance data 48, as well as test cell data 50, 51, is utilised to provide adjustment to the theoretical changes in specific fuel consumption determined through computational modelling. The on-wing performance data will allow fine tuning with respect of the constants a, b utilised to calculate changes in specific fuel consumption expected as a result of deterioration in the engine. Thus the specific fuel consumption when utilised as an engine performance parameter can be adjusted for expected deterioration with regard to the engine such that these expected deteriorations and changes in the engine performance parameter will not mask changes in that engine performance parameter as a result of variations in engine efficiency.

Although aspects of the present invention have been principally described above with regard to specific fuel consumption within a gas turbine engine it will be appreciated that other engine parameters may also be utilised as representative of engine thrust, such as pressures, temperatures, speeds, or any combination of these.

It will be appreciated that aspects of the present invention depend upon provision of stable conditions with regard to the gas turbine engine. If conditions with respect to thrust vary, then clearly there will be natural operational changes in the fuel flow rate as a result of those changes in the engine performance thrust. Stable conditions are therefore required with regard to determining the necessary constants a, b and for gathering other changes with regard to the engine performance parameter.

As will be appreciated, aspects of the present invention allow a more accurate measure of in-flight engine performance parameter deterioration, such as with regard to specific fuel consumption for individual engines. In such circumstances individual engines can be monitored more effectively leading to a better indication of engine efficiency and performance through the engine performance parameter, that is to say in the example given above, the specific fuel consumption. In such circumstances, engine design and operation can better reflect the specific fuel consumption requirement in-service and provide margins with regard to provision of that fuel consumption at various engine stages, which are more acceptable. By such approaches, with regard to more accurate determination of the engine parameter, that is to say with the example given, the specific fuel consumption, it will be understood that better fuel burn, better guarantees for operational performance and other factors can be achieved.

As will be appreciated by persons skilled in the art, the constants a, b determined for the respective bypass (low) pressure system will depend upon the individual engine. However, through appropriate computational modelling with respect to an engine type, initial values for the constants a, b can be determined. These constants a, b for that particular engine type can then be tailored and tuned to an individual engine by practical test results provided in-service as well as with respect to initial production testing of the individual engine and testing of the engine at overhaul stages. Thus, as indicated above, more accurate engine performance parameter determinations are provided and therefore allow better control of the engine in use.

Modifications and alterations to aspects of the present invention will be appreciated by those skilled in the technology. Thus, as indicated initially constants a, b will be determined by computational analysis and modelling but these constants may be amended appropriately by combination collection and adjustment. Such combination collection and adjustment may be periodic or continuous. The adjustment with respect to the offset change provided in accordance with aspects of the present invention, may be automatically implemented or after a period of data logging, along with comparison with the results from other engines of the same type, adjusted collectively or individually for a particular engine. It will be appreciated that engines may be subject to different operational conditions. For example, some engines may be operated with many take-off and landing operations, such as with respect to short haul aircraft requirements as compared to other engines which have different duty cycles and periods. In such circumstances, the engine performance parameter for each individual engine, in terms of the constant a, b may be adjusted dependent upon expected or previous duty cycles for the engine.

Using the calculation method in accordance with the present invention, an improved understanding of engine deterioration is achieved. With an improved understanding of engine deterioration it is possible to calculate a more accurate understanding of engine and host aircraft deterioration (drag in the case of the aircraft) over the life of the engine/aircraft. This allows engine users to more accurately monitor engine and aircraft deterioration, which can then be used to dictate engine or aircraft maintenance action and for fleet planning purposes. For example, engines/aircraft showing relatively low fuel consumption and low deterioration can be specifically selected for longer routes where low fuel consumption is critical to the successful completion of the mission. This more accurate analysis of fuel burn deterioration can also be used by component design groups to identify the requirement for certain component improvements and redesigns. It can also be used by marketing to show the most accurate picture of the aircraft and engine capability through in-service life.

This invention may also be adapted to monitor thrust increase in-service. By monitoring thrust increase it is quite feasible to re-align the thrust/EPR (engine pressure ratio) or thrust/TPR (turbine pressure ratio) relationship on engines such that over-thrust may be reduced and TGT (turbine gas temperature) and shaft speed margins may be optimised. This results in engines having longer service intervals before running out of TGT or shaft speed margins. A reduction in over-thrust in operation results in an associated and highly desirable reduction in fuel consumption in operation also. It should be apparent to the skilled artisan that the present invention may be used in real-time to adjust thrust settings of the engine.

As mentioned earlier, an engine deteriorates through wear in service and therefore the relationships between net thrust and power setting parameters can change slightly. Although these changes are relatively small from the point of view of the integrity of engine power settings, they are significant relative to monitoring changes in fuel burn at the power setting to determine levels of efficiency. It will be appreciated that changes of 0.1% and above are generally considered significant with regard to monitoring fuel flow for efficiency. For example, with regard to core engine pressure ratio (or temperature), engine degradation will cause the net thrust at the core engine pressure ratio to increase by in the order of 0.2 to 1.0%. In such circumstances the measured deterioration in engine fuel flow at the core engine pressure ratio will appear to be higher than the genuine deterioration in engine specific fuel consumption and so give a more pessimistic view of fuel consumption for the engine than is present in reality.

What is claimed is:

1. A method of monitoring a gas turbine engine performance parameter at a predetermined power setting for the engine as a determinant of engine efficiency, the method characterized in that a value for the engine performance parameter is adjusted for operational deterioration in the performance parameter, the value for the change in the parameter is given by a relationship:

S=(a×change in the parameter at core constant pressure ratio)+(b×change in the parameter at by-pass pressure ratio);

whereby a and b are constants determined for a specific engine type by analysis through a computer model of the specific engine with the steps of:

a) Determination of engine performance parameter values using a computer model with deterioration assumed only in the low pressure system for the engine to provide a low data set;
b) Determination of engine performance parameter values using a computer model with deterioration assumed only in the core pressure system for the engine to provide a core data set;
c) Determination of engine performance parameter values using a computer model with deterioration assumed in all pressure systems for the engine to provide a combined data set;
d) Scaling the low data set, the core data set and the combined data set to an equivalent of a predetermined value of deterioration in the value of S and plotting a relational variation for the relative changes in parameters due to the low pressure system and the core pressure system; and
e) Comparing the relative changes in the parameters due to the low pressure system and the core pressure system as solutions for the constants a, b in the relationship above through use of simultaneous equation analysis and solution of the respective relational variations;

thereby determining engine deterioration and subsequently improving the engine's operational efficiency.

2. A method as claimed in claim 1 wherein the core system further comprises a high pressure system and, where present, an intermediate pressure system of a gas turbine engine.

3. A method as claimed in claim 1 wherein the respective pressure systems include fan and turbine combinations in the gas turbine engine.

4. A method as claimed in any of claim 1 wherein the predetermined value of deterioration is above 0.1%.

5. A method as claimed in claim 1 wherein the low, core and combination data sets are determined by the same computational model or an aggregate of results from a plurality of computational models for each data set.

6. A method as claimed in claim 1 wherein the data sets are combined with test results for determination of engine performance parameters with regard to the engine.

7. A method as claimed in claim 6 wherein the data sets are augmented with in-service operational test results for the engine performance parameters.

8. A method as claimed in claim 1 wherein the engine performance parameter is any one of specific fuel consumption, pressure, temperature and shaft speed.

* * * * *

UNITED STATES PATENT AND TRADEMARK OFFICE
CERTIFICATE OF CORRECTION

PATENT NO. : 8,014,929 B2  Page 1 of 1
APPLICATION NO. : 12/263835
DATED : September 6, 2011
INVENTOR(S) : Michael Page et al.

It is certified that error appears in the above-identified patent and that said Letters Patent is hereby corrected as shown below:

On the Title Page, Item (56) should read

U.S. PATENT DOCUMENTS
2003/0125906 A1 7/2003 Guaglardi
2007/0203669 A1 8/2007 Hayashi

FOREIGN PATENT DOCUMENTS
EP 1298512 A2 2/2003
EP 1420153 A2 5/2004

Signed and Sealed this
Twenty-fifth Day of October, 2011

David J. Kappos
*Director of the United States Patent and Trademark Office*